United States Patent [19]
DeAngelis

[11] Patent Number: 5,344,506
[45] Date of Patent: * Sep. 6, 1994

[54] SHAPE MEMORY METAL ACTUATOR AND CABLE CUTTER

[75] Inventor: Dominick A. DeAngelis, Newtown Square, Pa.

[73] Assignee: Martin Marietta Corporation, East Windsor, N.J.

[*] Notice: The portion of the term of this patent subsequent to Oct. 7, 2008 has been disclaimed.

[21] Appl. No.: 781,461

[22] Filed: Oct. 23, 1991

[51] Int. Cl.$^5$ .............................................. B21F 11/00
[52] U.S. Cl. ........................................ 148/402; 83/18; 83/19; 83/523; 83/580; 29/426.4; 29/426.5; 30/92; 30/277; 30/278
[58] Field of Search ................... 148/402; 30/278, 90.1, 30/92, 277, 90.4, 250, 272.1; 407/7; 83/18, 19, 523, 580; 29/426.4, 426.5

[56] References Cited

U.S. PATENT DOCUMENTS

| | | | |
|---|---|---|---|
| 2,994,933 | 8/1961 | Wolfe | 24/141 |
| 3,246,396 | 4/1966 | Temple et al. | 83/580 |
| 3,450,372 | 6/1969 | DeLange et al. | 244/1 |
| 3,513,429 | 5/1970 | Helsop | 337/382 |
| 3,622,941 | 11/1971 | Wetmore | 339/98 |
| 3,885,484 | 5/1975 | Sturgis | 83/580 |
| 3,999,790 | 12/1976 | Rogen | 292/201 |
| 4,010,455 | 3/1977 | Stange | 340/224 |
| 4,019,925 | 4/1977 | Nenno et al. | 148/2 |
| 4,022,519 | 5/1977 | Hill | 339/30 |
| 4,044,358 | 8/1977 | Manning et al. | 343/18 A |
| 4,149,911 | 4/1979 | Clabburn | 148/11.5 R |
| 4,198,081 | 4/1980 | Harrison et al. | 285/381 |
| 4,233,731 | 11/1980 | Clabburn et al. | 29/859 |
| 4,314,682 | 2/1982 | Barnett et al. | 244/158 R |
| 4,405,387 | 9/1983 | Albrecht et al. | 148/11.5 R |
| 4,412,872 | 11/1983 | Albrecht et al. | 148/11.5 F |
| 4,450,616 | 5/1984 | Morita | 29/446 |
| 4,497,241 | 2/1985 | Ohtaka | 98/40.25 |
| 4,501,058 | 2/1985 | Schutzler | 29/446 |
| 4,531,988 | 7/1985 | Todoroki et al. | 148/402 |
| 4,553,393 | 11/1985 | Ruoff | 60/528 |
| 4,554,027 | 11/1985 | Tautzenberger et al. | 148/11.5 R |
| 4,617,448 | 10/1986 | Goldowsky | 219/200 |
| 4,619,568 | 10/1986 | Carstensen | 411/222 |
| 4,700,541 | 10/1987 | Gabriel et al. | 60/528 |
| 4,712,969 | 12/1987 | Kimura | 414/730 |
| 4,740,253 | 4/1988 | Simpson et al. | 148/11.5 R |
| 4,753,465 | 6/1988 | Dalby | 292/32 |
| 4,798,051 | 1/1989 | Foote | 60/527 |
| 4,836,496 | 6/1989 | Abujudom et al. | 251/11 |
| 5,245,738 | 9/1993 | Johnson | 29/426.4 |

FOREIGN PATENT DOCUMENTS 59-107737 6/1984 Japan.
63-147619 6/1988 Japan.

OTHER PUBLICATIONS

Hi-Shear Corp/Ordnance Division, Product Line Data Sheets SL1016 (1971), SL1010 (1965), SL1013 (1970), SL1022 (1965), SN9400 (1975) series, SN7000 (1969) series, SP series.

L. H. McCarty (ed.), "Shape Memory Alloy Drives Rotary Actuator", Design News, Feb. 2, 1990, pp. 180–181.

Primary Examiner—Richard Dean
Assistant Examiner—Sikyin Ip
Attorney, Agent, or Firm—Clement A. Berard, Jr.

[57] ABSTRACT

A shape memory alloy (SMA) actuator predeformed in compression actuates a cable cutter mechanism. A cable or other item to be cut is placed between an anvil and a movable blade affixed to the SMA element. The SMA element is heated by an electrical resistance heater to cause it to return to its undeformed elongated state, thereby moving the blade against the anvil to compress and sever the cable or other item. Ones of the shape memory alloy actuator have a plurality of parallelly arranged SMA elements, every other one of which is predeformed in compression and intermediate ones of which are predeformed in tension. The elements are coupled end-to-end so that, when they are heated to cause them to return to their undeformed states, their respective elongations and shrinkages combine at the output to produce an actuation that is the cumulation in the same direction of the changes of all the elements. The plurality of elements may be in a side-by-side or concentric arrangement.

22 Claims, 2 Drawing Sheets

SHAPE MEMORY METAL ACTUATOR AND CABLE CUTTER

The present invention relates to shape memory metal actuators, and in particular to such actuators adapted for cutting objects.

Every spacecraft mission requires the successful functioning of numerous one-time-operation mechanism components. These devices are used to retain, release and deploy instruments or other equipment which are secured to the spacecraft or launch vehicle structure during mission launch. A great deal of effort is required to ensure that these complex devices behave in a predictable manner. Generally, retention and release mechanism devices are actuated with pyrotechnic initiators which present problems such as safety, pyrotechnic shock, and contamination by the products of their firing. As spacecraft become increasingly complex, not only do they commonly require a larger number of such devices, but they are more susceptible to the adverse effects of these types of problems. For example, vehicles with optical instruments are extremely sensitive to contamination, and so may not be permitted to employ pyrotechnic devices. One solution has been the development of complex motorized latching mechanisms which present packaging and weight problems, as well as increased cost and complexity, and decreased dependability and reliability. The availability of simple, non-contaminating and passive mechanism elements would greatly reduce engineering test, engineering design and safety associated analysis.

The common pyrotechnic retention and release mechanism devices, such as pin pullers, separation nuts and cable cutters, generate large transient shock loads which are transmitted to the spacecraft structure, both from the pyrotechnic initiator firing and from the sudden release of strain energy from the mated parts. In most cases, these shock loads are more severe than the vibratory acceleration loads generated by the launch vehicle during launch. A great deal of time and effort is required to analyze the effects of these loads because they are very difficult to predict. Often it is necessary to redesign or "beef up" spacecraft structures and instruments to accommodate them. At times the analysis is so complex that representative load characteristics are really not known until actual testing is performed. Such testing is expensive and hazardous, and the results are uncertain due to the variability among pyrotechnic initiators. Moreover, pyrotechnic devices cannot be tested directly so there is always uncertainty as to whether a particular device will operate when called upon.

The overall effect of using pyrotechnic retention/release devices, instead of using passive devices, results in heavier spacecraft. However, pyrotechnic devices are generally more compact, more reliable and lighter (mechanism only) than motorized latching schemes. Reliable, slow-releasing, non-pyrotechnic alternatives to pyrotechnic retention and release devices would greatly reduce the transient shocks generated upon actuation as well as reducing the cost and weight associated therewith.

Thus, there is a need for reliable, low-shock-generating, slow releasing, passive, compact, non-contaminating, simple and lightweight alternatives to pyrotechnic retention and release and deployment mechanism devices. It is further desired that such alternatives be repeatable and testable, as well as suitable for application to spacecraft and other remote equipment.

Accordingly, the present invention comprises a shape memory alloy member having predetermined deformation from its undeformed shape, and a movably arranged blade and anvil which are affixed in relation to a housing and the member at respective locations thereon. When the member is heated and returns toward its undeformed state, the blade and anvil move closer together for compressing a workpiece therebetween.

In another aspect of the invention, a plurality of shape memory alloy members are arranged substantially parallelly with alternate ones thereof being predeformed from their undeformed shapes in compression and the intermediate ones thereof in tension. The members are coupled to each other in alternating sequence whereby the shape changes associated with their returning toward their undeformed shape accumulate at the end of the last member.

Figure 1:
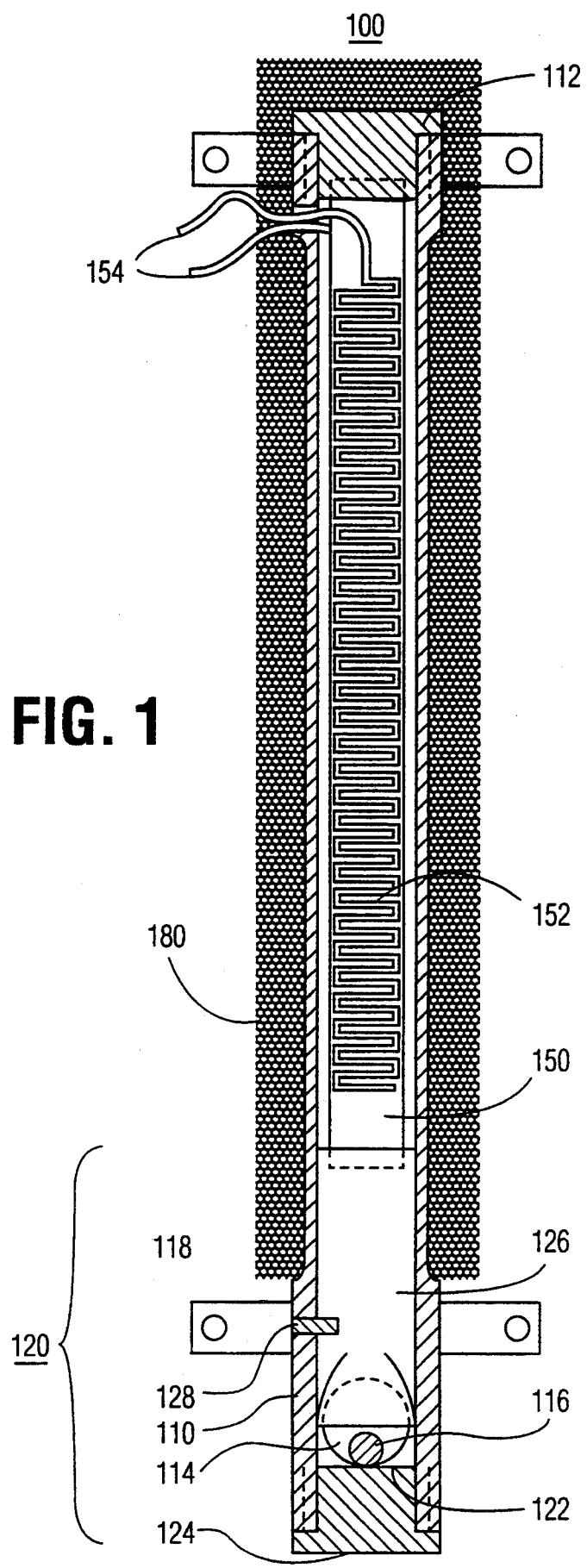
FIG. 1 is a diagram of an arrangement including the present invention.

Several alloys are known to exhibit shape memory properties. The shape memory alloy (SMA) employed in the arrangements described herein is a nickel titanium alloy (NiTi or NiTiNOL) which, although expensive, possesses the most capability. NiTiNOL is a Nickel Titanium shape memory alloy believed to have been developed, in the early 1960's, at the Naval Ordnance Lab. SMA materials are available from Shape Memory Applications located in Sunnyvale, Calif. and from Furukawa Electric located in Tokyo, Japan. Shape memory alloys exhibit the property of "remembering" a preset or "stored" shape, even after the material is severely deformed into a different shape. The shape memory recovery is induced by the application of heat, such as from hot water or electrical heaters, and can be triggered at a preset temperature that is determined by the particular alloy composition. Transformation temperatures between $-100°$ C. and $+100°$ C. are possible. The rate at which the recovery can occur is limited by how fast heat can be applied.

For single cycle applications, i.e. one-time actuation, NiTiNOL can recover up to an 8% memory strain ($\delta L/L$) without significant residual strain. For applications involving a few cycles (for example, <10), a 5% memory strain is a reasonable design guideline, and for multiple cycle applications (up to 10 million), a 3% memory strain is a reasonable design guideline. To compare these strain values with typical engineering alloys, consider the following: A specimen of a typical steel alloy (ASTM-386) would begin yielding for strains greater than 0.12% (titanium *6a14v* 0.73%, aluminum *6061-T6 * 0.37%). For a 100° C. temperature change, a specimen of a typical steel alloy would elongate by about 0.12% of its length (titanium 0.10%, aluminum 0.24%).

Typical engineering alloys work-harden and fatigue quickly under high cyclic stresses. In deformation, the atomic planes within the material are believed to slide over one another and establish a new crystal position. There is no means by which the material can "remember" where the atoms were before they moved, thus, the crystal can not exhibit "memory" properties. Also, as the metal is deforming the dislocations become increasingly tangled, causing work-hardening and damage to the crystalline order of the material.

In shape memory alloys, however, the deformation is permitted by changing the "tilt" of a twin orientation of crystals. However, this does not cause any dislocation motion. Instead, the crystal structure of the martensite (cold phase) forms by the shearing of the austenite lattice (hot phase). Upon heating, this permits only one crystalline direction that the martensite lattice can move when restoring to the austenite structure. Therefore, the material will in its martensite (cold) phase "remember" or restore to the shape formed in its austenite (hot) phase. Because the shape memory recovery process does not damage the crystalline structure, a very high fatigue life can be obtained even under large strains and stresses.

The process utilized to "store" or preset a shape in a NiTiNOL SMA element is outlined below.

Step 1. Obtain the initial form of a SMA element, for example, a piece of straight rod or tube of predetermined length that is the desired stored shape (i.e. the shape to which it is desired that the element return to when heated in use).

Step 2. Clamp the element to prevent distortion or motion during heat treatment.

Step 3. Heat treat (anneal) the clamped element in an oven at a temperature well above its transformation temperature, typically at 400° C. to 500° C. for up to one hour, in an inert atmosphere.

Step 4. Cool the clamped element back to a temperature which is below its transformation temperature, e.g. room temperature.

Step 5. Form the element into the desired shape by plastically deforming it, for example, compress it to shorten its length.

Thereafter, when the plastically deformed element is heated to a temperature above its transformation temperature it will return to its undeformed state, i.e. the stored shape.

This process can be repeated many times on the same element without significant degradation. The "stored" shape need not be the same each time, however, the material will only "remember" the last "stored" shape; the previous shape is lost in the annealing process. NiTiNOL is also available with cryogenic transformation temperatures, and the process above will differ with respect to the temperatures employed.

When an SMA element is employed in an apparatus such as that described herein which may be required to be operated only a few times, it is satisfactory to repeat only step 5 of the process.

Reductions in weight and electrical power requirements for shape memory alloy elements can be achieved by optimizing the thermodynamic cycle of the shape memory metal in force, length and temperature space. For example, to achieve the same force output, one can reduce the cross-section of the SMA element and adjust the power of the drive heaters to heat the element to the higher transformation temperature created by the increased stress level. Also, an increased understanding of the behavioral characteristics of the SMA material will allow devices to operate with a lower margin of safety, thus, lighter mass elements can be used. For example, the SMA-actuated cable cutter described herein generates about 4,000 pounds of force to sever a cable, even though a 5/32 inch diameter cable preloaded to 1,200 pounds (typical maximum) requires only about 800 pounds to sever it. Thus the margin of safety is about five times. Since the SMA material possesses both a specific heat (0.32 J/gm-° C.) and a latent heat of transformation (21 J/gm) as do liquids such as water, larger element masses require greater energy levels for actuation (i.e. to convert from the martensite phase to the austenite phase). However, lower mass elements produce larger stress levels which in turn creates higher stress-induced transformation temperatures, so optimization should be employed for element selection.

In addition, the SMA material possesses several peculiarities in its characteristics relative to compression and tension. For example, an exemplary SMA tube element (4" long, OD=0.412", ID=0.28") requires about 1,400 pounds of force to plastically elongate the tube by 0.16 inch (i.e. net deflection after the tensile load is removed). However, the same element requires about 10,000 pounds of force to plastically compress the tube by 0.16 inch (i.e. net deflection after the compressive load is removed). Also, whereas an absolute maximum of about 8% apparently exists for maximum recovery strain in tension, present experience suggests that 5% is about the maximum practicable recovery strain in compression, with very little residual strain.

In FIG. 1, cable cutter 100 includes an elongated tubular housing 110 having cutter mechanism 120 at one end thereof. A circular hole 114 through tubular housing 110 provides an opening through which an object to be cut, for example, cable 116 may pass through. The upper semicircular half of hole 114 is blocked from view in FIG. 1 by blade 126. The cable is cut when cutter blade 126 is forced downward against anvil 122 which is held in place by end cap 124 which screwed into the threaded end of tubular housing 110. Anvil 122 and end cap 124 are a single piece. Prior to operation, cutter blade 126 is restrained from moving by shear pin 128. Shape memory alloy (SMA) rod 150 is compressed in the manner according to the procedure set forth hereinabove. Its ends are inserted into recesses in cutter blade 126 and end cap 112, respectively, and it is placed under a slight compression load when end cap 112 is screwed in place. Prior to installation, electrical resistance heaters 152 are mounted to SMA rod 150 and the electrical leads 154 thereof pass through an opening in housing 110 thence to a source of electrical energy when activation is desired. Tubular housing 110 is encased in a thermal insulation material 180 to minimize the portion of the heat generated by electrical heaters 152 that is lost through the housing, thereby to cause a greater portion of the heat generated by heaters 152 to be absorbed by SMA rod 150 and raise its temperature toward the transformation temperature.

Operation is initiated by the application of electrical power to leads 154 to develop heat in electrical heaters 152 thereby to increase the temperature of SMA rod 150. When the temperature of SMA rod 150 reaches the transformation temperature SMA rod 150 develops an internal stress tending to elongate the rod to its original uncompressed length. This force urges cutter blade 126 in the direction of anvil 122. However, motion does not begin until the stress reaches the level necessary to shear the shear pin 128, typically about 50 pounds. Then the object 116 to be cut, which passes through the hole 114, is compressed between the sharpened edge of cutter blade 126 and the surface of anvil 122. As the temperature of SMA rod 150 increases, the compressive force against object 116 increases until the point at which the object is severed by cutter blade 126.

In an exemplary embodiment of the cable cutter 100 of FIG. 1, SMA rod 150 is a 6.0 inch long nickel titanium alloy rod of about 0.41 inch outside diameter. Electrical resistance heaters 152 comprise two thermofoil resistors, each about 4" long and 0.5" wide, with an aluminum backing placed against and conforming to the shape of rod 150. The two resistors are held in place against rod 150 by an overwrap of Kapton ® heat shrinkable tape of the type known as Shrink Band No. 4, Part No. EI-103, available from Minco Company of Minneapolis, Minn. The thermofoil heaters employ Kapton ® insulation; two 22 ohm resistors are employed in parallel, each generating about 36 watts with 28 volts applied to produce a total heating power of about 72 watts for SMA rod 150, and are also available from Minco Company. SMA rod 150 produces a stroke of about 0.25 inch with a maximum force of about 4,000 pounds pressing cutter blade 126 against anvil 122. Cutter blade 126 is made of QQ-T-570 tool steel with a nickel plate, or alternatively may be made from 17-4 PH stainless steel. Thus, cutter blade 126 is a relatively hard material. Anvil 122, on the other hand, is made of a softer material such as 303 stainless steel. Thermal insulation 180 preferably comprises a multilayer insulation system, for example, one having an outer layer of 2 mil Kapton ® film with an indium tin oxide coating on the outside surface and an electro-deposited aluminum coating on the surface facing toward housing 110. The intermediate ten layers are comprised of a Mylar ® or Dacron ® fabric mesh and the inner layer closest to housing 110 is a 1 mil thick Kapton ® sheet with electro-deposited aluminum thereon.

To assemble cutter 100, SMA rod element 150 is plastically compressed axially about 0.25 inch, which is about 4.2% of its length (net displacement after the compressive load is relieved), prior to installation into housing 110. Upon heating the SMA rod element 150 elongates with the capability of generating over 4,000 pounds of force and severs the cable 116 with a "guillotine" type motion between the hardened steel cutter blade 126 and the soft steel anvil 122.

The amount of shearing force required to cut a cable, as well as the actuation time, depends on cable preload. For example, about 1,800 pounds of force is required to sever a 5/32 inch diameter cable under zero pounds preload; the cutter herein described requires approximately 90 seconds to sever such unloaded cable. Where the same cable is under 1,200 pounds of preload, however, approximately 800 pounds of force is required to sever the cable; the cutter herein described requires approximately 60 seconds to sever the preloaded cable.

Under vacuum conditions at −180° C., the actuation time increases to about 150 seconds from the 90 seconds mentioned above. This is because the phenomenon of shape memory alloy transition is a function of energy (Joules), and not power (watts, where a watt=a Joule/second), required to cause an amount of SMA material of a given mass to transition from its martensitic state and its austenitic state. Therefore, the actuation time is a function of the power output of the heater (i.e. watts), with a smaller heater power corresponding to a proportionately longer actuation time.

In addition to the advantages set forth above for the SMA cable cutter, other beneficial effects have been observed. For example, during actuation the cable preload is relieved up to about 95% before the cable severs completely due to the relatively slow, almost "strand-by-strand" cutting action. During this cutting process, the strands remaining uncut plastically elongate and yield, thereby gradually relieving the preload and allowing the cable to sever with substantially no shock being induced. Furthermore, no debris is generated upon actuation, either from the SMA material or from the cable. A further advantage is that following actuation, cutter 100 may be disassembled and SMA rod 150 may be recompressed and the cutter then reassembled, thereby permitting actual testing and reset of the components of cutter 100 and its subsequent use without the addition of new and untested components or parts, as is the case with pyrotechnically actuated devices.

Figure 2:
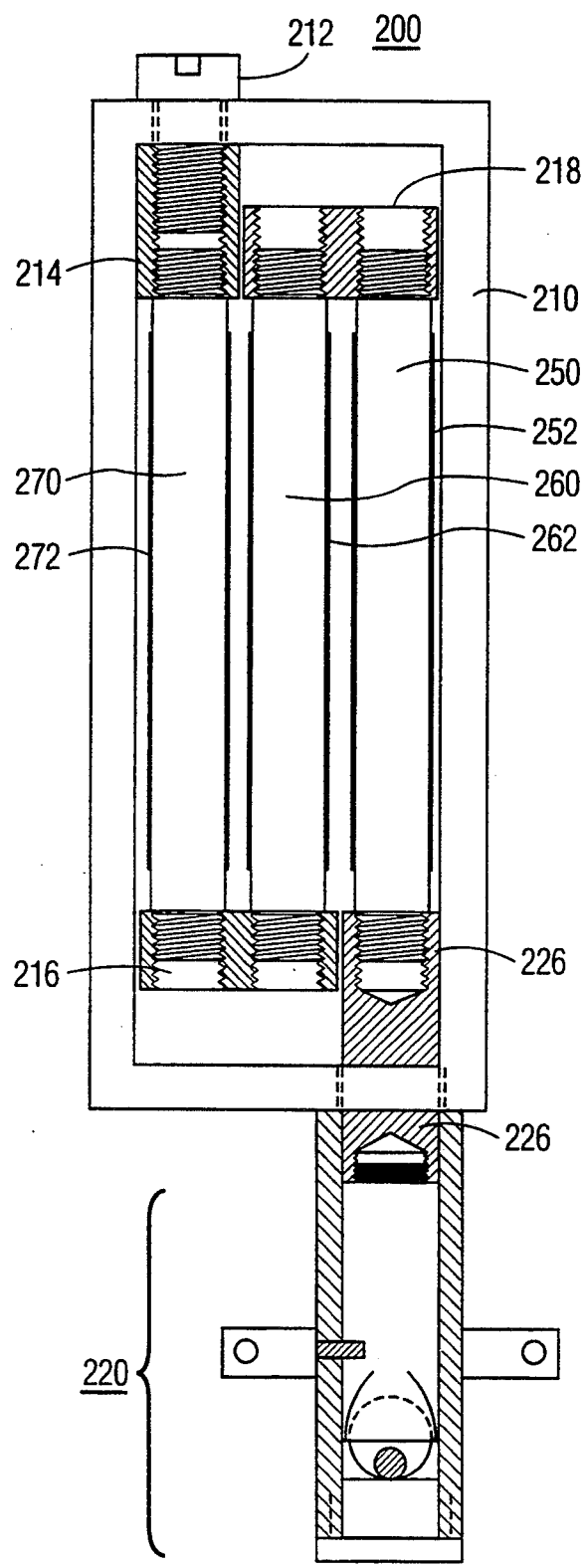
FIGS. 2 and 3 are each a diagram of an alternative activating arrangement in accordance therewith.

In FIG. 2, cutter 200 employs a cutter mechanism 220 which is substantially the same as that described above for cutter mechanism 120. Cutter 200 employs a compound parallel element SMA actuator including three SMA rods 250, 260 and 270. Within housing 210, which may be made of one or more pieces, a first threaded end of SMA rod 270 is threaded into base coupling 214 which is fixedly held against the end of housing 210 by bolt 212. The second end of rod 270 is attached parallel to SMA rod 260 by means of both said rods being screwed into parallel threaded holes in coupling joint 216. The threaded second end of rod 260 is attached to the threaded first end of rod 250 by both said rods being screwed into parallel threaded holes in coupling joint 218. The threaded second end of SMA rod 250 is attached to a coupling pin 226 by being screwed into a threaded hole therein. Pin 226 is slidable in a direction parallel to the axis of rod 250 through a hole through the lower end wall of housing 210. Although pin 226 may, in fact, be a separate piece from cutter blade of cutter 220 as shown in FIG. 2, the blade 126 may, if convenient, be simply and directly attached by screwing the threaded second end of SMA rod 250 into a threaded hole in the end of the blade opposite its sharpened end.

In cutter 200, SMA rods 250 and 270 are predeformed so to be in a compressed state, whereas SMA rod 260 is predeformed to be in an elongated state. Two parallel heater resistors 252, 262 and 272 (each pair producing together about 66 watts) are mounted on each of SMA rods 250, 260 and 270, respectively, using the same materials and mounting arrangement as described above in relation to FIG. 1. When these heaters are activated, the temperatures of rods 250, 260 and 270 increase until they reach their transformation temperature at which point rod 270 elongates, driving joint 216 in a direction to move coupling joint 216 and thus rod 260, joint 218, rod 250, pin 226 and the cutter blade toward the anvil of the cutter mechanism 220. In like manner, SMA rod 260 which is in tension becomes shortened, thereby also moving joint 218, rod 250, pin 226 and the cutter blade in the direction toward the anvil. Further, SMA rod 250 also elongates further driving pin 226 and the cutter blade in the direction of the anvil. As a result, the cutter blade moves toward the anvil a distance that is the sum of the elongation of rods 250 and 270 plus the shortening of rod 260, developing a force at least as great as that generated by the weakest of rods 250, 260 and 270.

In an exemplary embodiment according to FIG. 2, rods 250 and 270 are each 4.17 inches long and have an outside diameter of 0.412 inch, and are plastically compressed axially by 0.17 inch, i.e. 4.1% of their length (net displacement after the compression load is relieved) prior to installation. Rod 260 which is in tension is 3.84 inches long and has the same outside diameters as do rods 250 and 270 and is plastically elongated axially by 0.16 inch, also about 4.2% of its length (net displacement after the tension load is relieved). Upon heating, the elongated inner SMA rod element 260 shrinks and the compressed outer SMA rod elements 250 and 270 will elongate, together creating a relative aggregate motion or stroke of about 0.5 inch for pin 226 with respect to the base joint 214. Cutter 200 of FIG. 2 actuates at room temperature approximately 90 seconds after the application of electrical power to heaters 252, 262 and 272, and generates approximately 4,000 pounds of force, the same as that described above in relation to cutter 100 of FIG. 1. In vacuum at −180° C. actuation time lengthens to approximately 150 seconds.

If the SMA rods 250, 260 and 270 described in the previous paragraph are replaced by SMA tubes of like diameter and length but with an inside diameter of 0.28 inch, which tubes are elongated and compressed a like amount to that described above, cutter 200 will also produce a 0.5 inch stroke at pin 226 but will have a capability of generating about 2,000 pounds of force.

In the component arrangement of SMA elements of FIG. 2, a plurality of SMA elements of alternating predeformation (every other element (250, 270) is predeformed in compression with intermediate elements (260) predeformed in tension) with their ends, coupled together so that the relaxation of such predeformation accumulates upon actuation. Although three SMA elements 250, 260 and 270 comprise the component arrangement of FIG. 2, a greater or lesser number of elements may be employed, with alternating compression and tension predeformation throughout the progression of elements. The number may be even or odd.

Figure 3:
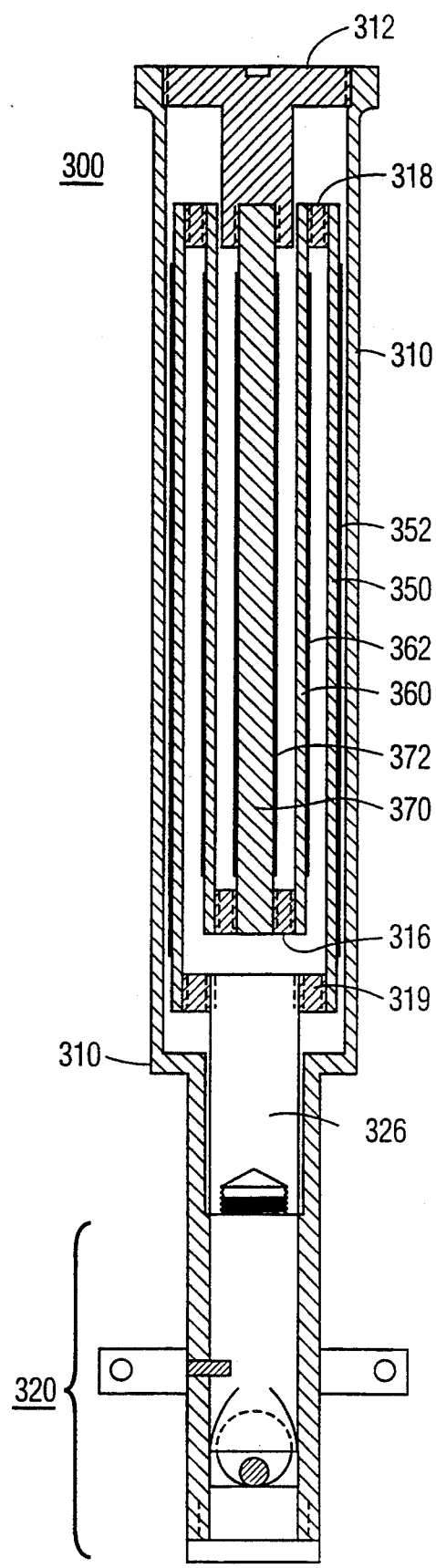

FIG. 3 is an alternative embodiment having compound SMA elements similar to those described in relation to FIG. 2. Cutter 300 employs three concentric SMA elements 350, 360 and 370 to produce an aggregated action similar to that described for rods 250, 260 and 270 of FIG. 2. Cutter 300 includes a tubular housing 310 to which is attached a cutter mechanism 320 substantially the same as that shown and described in relation to cutter 120 of FIG. 1. A first end of inner SMA rod 370 is threaded to be fixedly attached to the threaded hole in end cap 312 which is threaded to be screwed into the threaded end of housing 310. The threaded second end of rod 370 is screwed into the internal threads of coupling ring joint 316, the external threads of which are screwed onto the threaded first end of SMA tube 360. The threaded second end of SMA tube 360 is screwed into the internal threads of coupling ring joint 318, the external threads of which are screwed into the threaded first end of outer SMA tube 350. The threaded second end of outer SMA tube 350 is screwed via coupling ring joint 319 to coupling pin 326 which is attached to the cutter mechanism 320 in substantially the same manner as described above in relation to FIG. 2. Similarly to that described above, aluminum-foil-backed electrical resistance heaters 353, 362 and 372 are respectively bound to the outer surfaces of SMA tubes 350, 360 and SMA rod 370 using Kapton ® shrink tape as described above.

Inner SMA rod 370 and outer SMA tube 350 are each predeformed in compression and will elongate when their temperature is increased to the transformation temperature by the application of electrical energy to their respective resistance heaters. In like manner, inner SMA tube 360 is predeformed to be elongated and will shrink when raised to its transformation temperature. Further, bars, dowels, rods, tubes, and other shaped SMA members may also be employed.

As an exemplary embodiment of cutter 300, if the effective lengths of tubes 350 and 360 and that of rod 370 are made the same as the lengths of corresponding elements 250, 260 and 270 of FIG. 2, and if they are respectively compressed and elongated in like amounts to that described in relation to FIG. 2, then the stroke at coupling pin 326 will also be about ½ inch. Further, if inner SMA rod 370 is 0.412 inch in diameter and the outside diameters and inside diameters of outer and inner tubes 350 and 360 are selected so that they each have the same cross-sectional area as that of rod 370, cutter 300 will also have the capability of generating a force of up to about 4,000 pounds at coupling 326.

It should be understood that the housing 210 of cutter 200 in FIG. 2 and the housing 310 of cutter 300 in FIG. 3 are preferably encased in a thermal insulation material, such as that described above in relation to thermal insulation 180 of cutter 100 of FIG. 1.

Various alternatives and modifications to the foregoing would be evident to one of skill in the art and are within the scope of the present invention which is limited only by the claims following. For example, the actuating arrangements of FIGS. 2 and 3 could be employed to activate mechanisms other than cutters 220 and 320, such as separation nuts, pin pullers, valves, gear boxes and the like.

Alternative heating methods could be employed in place of the electrical resistance heaters described herein. Housings 110, 210 and 310 could be adapted with inlet and outlet orifices through which a heated fluid could be passed, thereby to raise the temperature of the SMA elements within such housings to their transformation temperature for actuating such arrangements. The fluid could be either a heated gas or a heated fluid such as water or oil. In such instance, for example, one might design cutter blade 126, or pins 226 or 326, similarly slidably mounted within the bore of the respective housing, to be a close fit not requiring gasketing or, in the alternative, to circumferentially groove said cutter or pins so that it will accept and ride on O-rings therein, thereby sealing the fluid within the cavity of the aforementioned housing.

It is further noted that the shape memory alloy (SMA) actuators described hereinabove may be beneficially employed to actuate devices other than the cutters described herein. For example, pins 226 or 326 could be employed just to move an object with respect to housing 210 or 310, respectively, and whatever such housing might be attached to. Such actuators might also be employed so that pins 226 and 326, for example, are retracted into housing 210 and 310, respectively, rather than being extended as in the case where a cutter mechanism 220 or 320, respectively, is employed therewith. In such case, SMA rods 250 and 270 are predeformed to be in tension and will shorten when raised to their transformation temperature, whereas SMA rod 260 thereof is predeformed to be in compression and will elongate when raised to said temperature. In similar fashion, the concentric tube actuator of cutter 300 may also be modified so that upon activation pin 326 is retracted into the housing 310, where outer SMA tube 350 and inner SMA rod 370 are in predeformed to be tension and will shrink when raised to their transformation temperature and where inner SMA tube 360 is predeformed to be in compression and will elongate when raised to said temperature.

It is preferred that housings 110, 210 and 310 be surrounded by thermal insulating material so as to concentrate the heat generated internal to said housing upon the SMA elements therein. While a multilayer insulation system comprising 13 layers was described in relation to FIG. 1, more conventional insulation materials, such as urethane foams, fiberglass and the like may also be employed.

Further, the workpiece may be a tube, pipe or conduit rather than a cable or bolt. Still further, the blade need not be sharpened to cut the workpiece but may be shaped so as to deform it in a desired fashion. For example, where the workpiece is a tube through which fluid flows, the blade may be made to have a broad flat area that deforms the tube to pinch closed the fluid passage, thereby serving as a shut-off valve.

What is claimed is:

1. An arrangement for cutting a workpiece comprising:
   a mounting;
   a blade and an anvil mounted in movable relationship for moving closer together for cutting a workpiece therebetween, one of said blade and said anvil being affixed to said mounting;
   a shape memory alloy member having a predetermined deformation from its undeformed state, said member being affixed at one location thereon to said mounting and at another location thereon to the other of said blade and said anvil; and
   means for heating said member to a temperature sufficient for said member to return toward said undeformed state, said return tending to move said blade and said anvil closer together for cutting said workpiece.

2. The arrangement of claim 1 wherein said mounting includes a housing having a bore therethrough, one of said blade and said anvil being slidably mounted in said bore.

3. The arrangement of claim 2 wherein said member is in said bore of said housing and is affixed to said one of said blade and said anvil therein.

4. The arrangement of claim 3 wherein the other of said blade and said anvil is affixed to said housing proximate said bore.

5. The arrangement of claim 1 wherein said member is a rod predeformed in compression, whereby said rod elongates when heated to a predetermined temperature.

6. The arrangement of claim 1 wherein said member is nickel titanium alloy.

7. The arrangement of claim 1 wherein said means for heating includes an electrical resistance heater affixed in substantial conformity to the surface of said shape memory alloy member.

8. The arrangement of claim 1 wherein said shape memory alloy member comprises:
   at least three shape memory alloy elements each having first and second ends arranged with their respective first ends proximate each other and with their respective second ends proximate each other first and third ones of said elements each being deformed from its undeformed state in one of compression and tension and a second one thereof intermediate said first and third ones thereof being deformed therefrom in the other one of compression and tension;
   means for coupling the first end of the first of said elements to said mounting,
   means for coupling the second end of the third of said elements to said other of said blade and said anvil; and
   means for coupling the second one of said elements at its second end to the second end of the first one of said elements and at its first end to the first end of the third one of said elements.

9. The arrangement of claim 8 wherein said elements have shapes selected from the group including bars, rods and tubes, and said elements are arranged with their respective longitudinal axes in substantially parallel spaced-apart relationships.

10. The arrangement of claim 8 wherein said elements have shapes selected from bars, rods and tubes, and said elements are arranged substantially concentrically with their respective longitudinal axes substantially colinear.

11. The arrangement of claim 1 wherein said blade is shaped for compressing said workpiece to sever it.

12. A shape memory alloy arrangement comprising:
    a mounting;
    at least three shape memory alloy members, each having undeformed states and first and second ends, arranged with their respective first ends proximate each other and with their respective second ends proximate each other, first and second ones of said members each being deformed from its undeformed state in one of compression and tension and a second one of said members intermediate said first and third ones of said members being deformed from its undeformed state in the other one of compression and tension;
    first means for affixing the first end of the first one of said members to said mounting, and the second end of the third one of said members being adapted for coupling to a utilization device;
    means for coupling the second one of said members at its second end to the second end of the first one of said members and at its first end to the first end of the third one of said members; and
    means for heating said members to a temperature sufficient for said members to return toward their respective undeformed states; whereby the shape changes associated with each of said members returning to its undeformed state tend to cumulate at the second end of said third member.

13. The arrangement of claim 12 wherein said members have shapes selected from the group including bars, rods and tubes, and said members are arranged with their respective longitudinal axes in substantially parallel spaced-apart relationships.

14. The arrangement of claim 13 wherein said members are side-by-side.

15. The arrangement of claim 14 wherein the first of said members that is fixed to said mounting is predeformed in compression.

16. The arrangement of claim 15 wherein said utilization device comprises an anvil and a blade, one of said anvil and said blade being coupled to the second end of the third of said members and the other of said anvil and said blade being affixed to said mounting proximate said one of said anvil and said blade for receiving said one thereof thereagainst when ones of said members return to their undeformed states.

17. The arrangement of claim 12 wherein said members have shapes selected from bars, rods and tubes, and said members are arranged substantially concentrically with their respective longitudinal axes substantially colinear.

18. The arrangement of claim 17 wherein the first of said members that is fixed to said reference point is predeformed in compression.

19. The arrangement of claim 17 wherein said utilization device comprises an anvil and a blade, one of said anvil and said blade being coupled to the second end of the third of said members and the other of said anvil and said blade being affixed to said mounting proximate said one of said anvil and said blade for receiving said one thereof thereagainst when ones of said members return to their undeformed states.

20. An apparatus for generating motion relative to a mounting in response to temperature, comprising:
a plurality of prestressed elements defining first and second ends, each of said prestressed elements exhibiting the property of changing from a stressed dimension to a relaxed dimension between said first and second ends upon reaching a predetermined temperature, the first and second ends of each of said prestressed elements defining an axis therebetween, said plurality of elements including at least one first element which, in a direction parallel to a first axis of said first element, has a stressed dimension which is one of greater than and lesser than its relaxed dimension, and at least second and third elements, each of which, in directions parallel to second and third respective axes of said second and third elements, respectively, have stressed dimensions which are the other one of greater than and lesser than their relaxed dimensions;

mechanical coupling means coupled to said first, second and third elements, for, with said first, second and third axes mutually parallel, rigidly connecting (a) said first end of said second element to said mounting, (b) said second end of said second element to said first end of said first element, and (c) said second end of said first element to said first end of said third element; and heating means thermally coupled to said first, second and third elements for causing them to reach said predetermined temperature at a time when said motion is desired, whereby said second end of said third element moves relative to said mounting.

21. An apparatus according to claim 20 wherein said first, second and third elements are elongated in the direction of said first, second and third axes, respectively, and wherein said elements are located side-by-side with said first, second and third axes mutually parallel.

22. An apparatus according to claim 20, wherein:
said second element is elongated in the direction of said second axis and has an outer dimension;
said first element is elongated in the direction of said first axis, with an outer dimension, and with a bore having an inner dimension greater than said outer dimension of said second element;
said third element is elongated in the direction of said third axis, with a bore having an inner dimension greater than said outer dimension of said first element; and
said first, second and third axes are coaxial.

* * * * *